No. 887,195. PATENTED MAY 12, 1908.
O. C. HOPKINS.
TRUCK.
APPLICATION FILED NOV. 23, 1907.

3 SHEETS—SHEET 1.

Witnesses  Inventor
Oscar C. Hopkins
By E. H. Bond, Attorney

No. 887,195. PATENTED MAY 12, 1908.
O. C. HOPKINS.
TRUCK.
APPLICATION FILED NOV. 23, 1907.
3 SHEETS—SHEET 2.
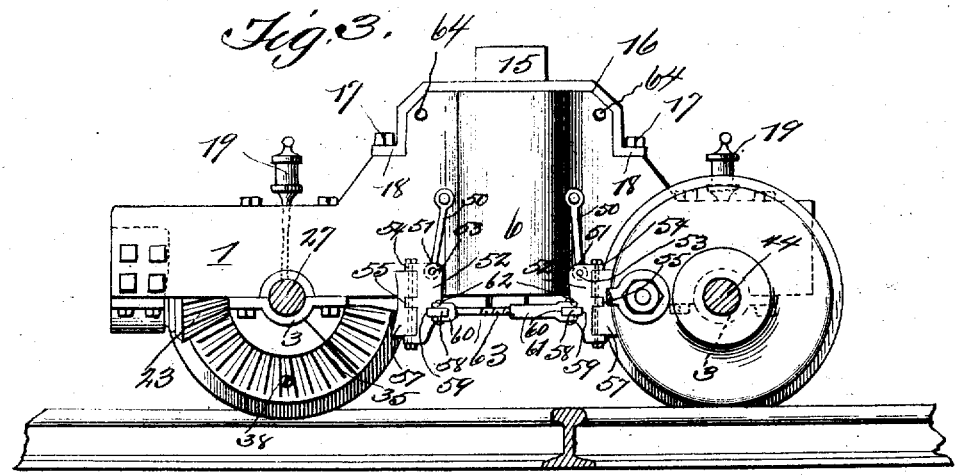
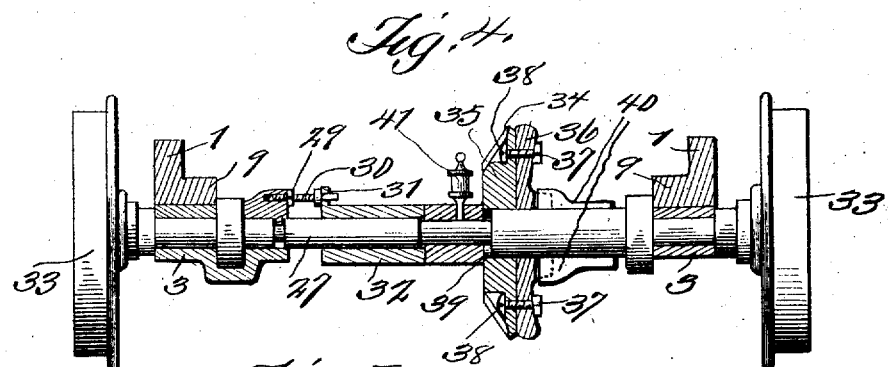
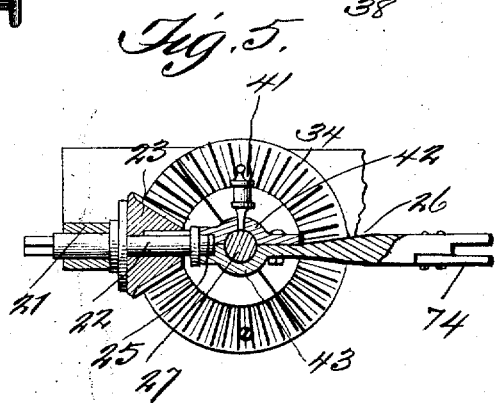
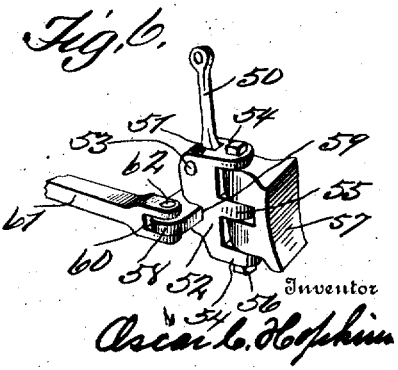
Witnesses
Inventor
Oscar C. Hopkins
E. N. Bond
Attorney No. 887,195. PATENTED MAY 12, 1908.
O. C. HOPKINS.
TRUCK.
APPLICATION FILED NOV. 23, 1907.
3 SHEETS—SHEET 3.
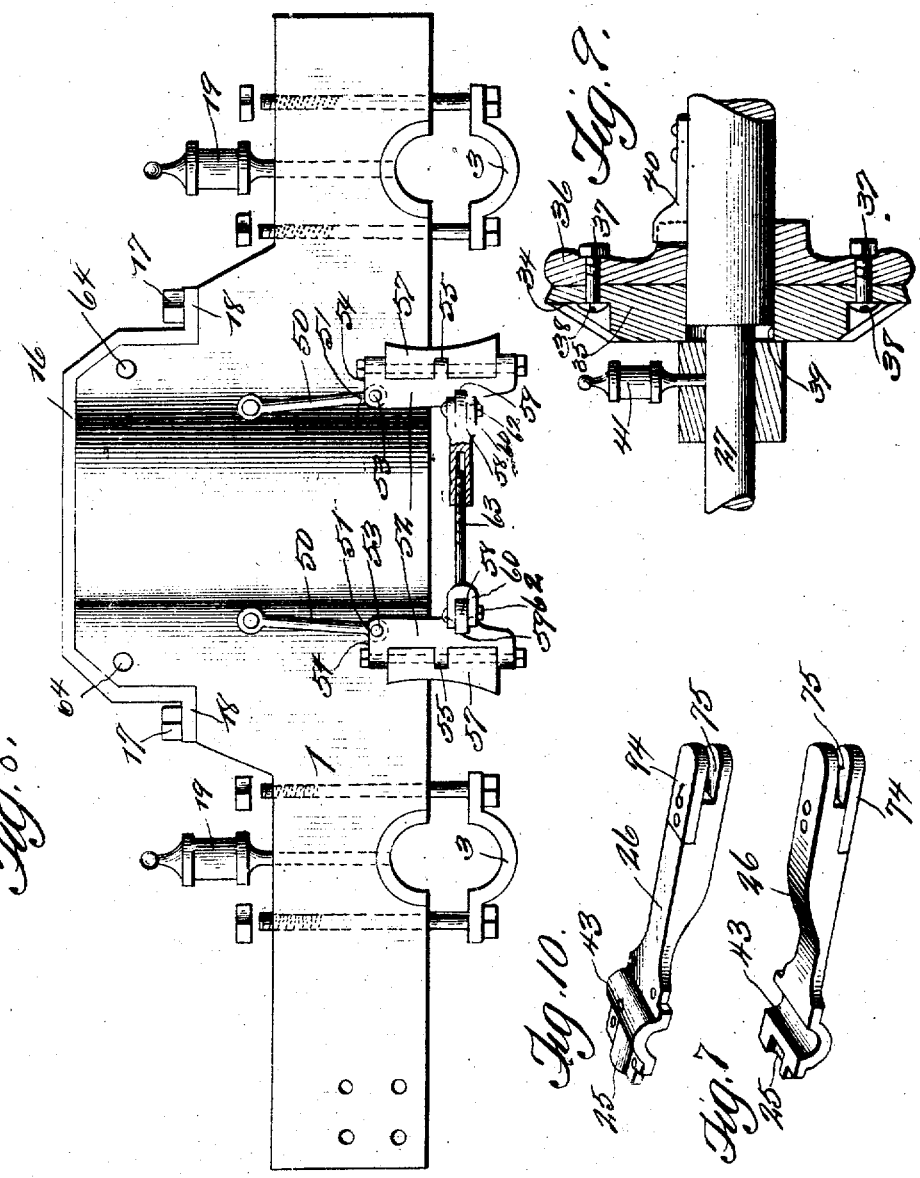
Witnesses
Inventor
Oscar C. Hopkins
By
E. H. Bond
Attorney

UNITED STATES PATENT OFFICE.

OSCAR C. HOPKINS, OF MOUNT STERLING, NORTH CAROLINA.

TRUCK.

No. 887,195.   Specification of Letters Patent.   Patented May 12, 1908.

Application filed November 23, 1907. Serial No. 403,484.

*To all whom it may concern:*

Be it known that I, OSCAR C. HOPKINS, a citizen of the United States of America, and resident of Mount Sterling, in the county of Haywood and State of North Carolina, have invented certain new and useful Improvements in Trucks, of which the following is a specification.

This invention relates to certain new and useful improvements in trucks for locomotives, and while the invention relates primarily to locomotives generally to be used upon railroads, it is intended more especially for engines which are to be operated on railroads and tram roads where great tractive power is needed at a moderate speed, where there are uneven road beds, steep grades and sharp curves.

The invention is applicable also to other uses such as upon electric motors, street cars and the various other forms of motive power vehicles.

The present invention has for its objects among others to provide a novel construction of truck having a central longitudinally disposed driving shaft designed to be driven by engines of different types, there being two of the same type to each locomotive and designed to be connected together by a central longitudinal driving shaft with gear wheels on the inside or forward axle. The forward axle driven by beveled gear wheels is connected to the back wheel by side rods connected to the driving wheel of the forward axle, a multiplicity of universal couplings being provided which allows it to make a sharp curve without straining the parts, braces being provided on each truck and adapted for operation entirely independent of each other. I provide a steel plate fitted on the inside of the truck frame and bolted thereto so as to prevent the truck from getting out of square.

I aim further at improvements in the details of construction whereby a strong and efficient truck is provided.

Other objects and advantages of the invention will hereinafter appear and the novel features thereof will be particularly pointed out in the appended claims.

Figure 1:
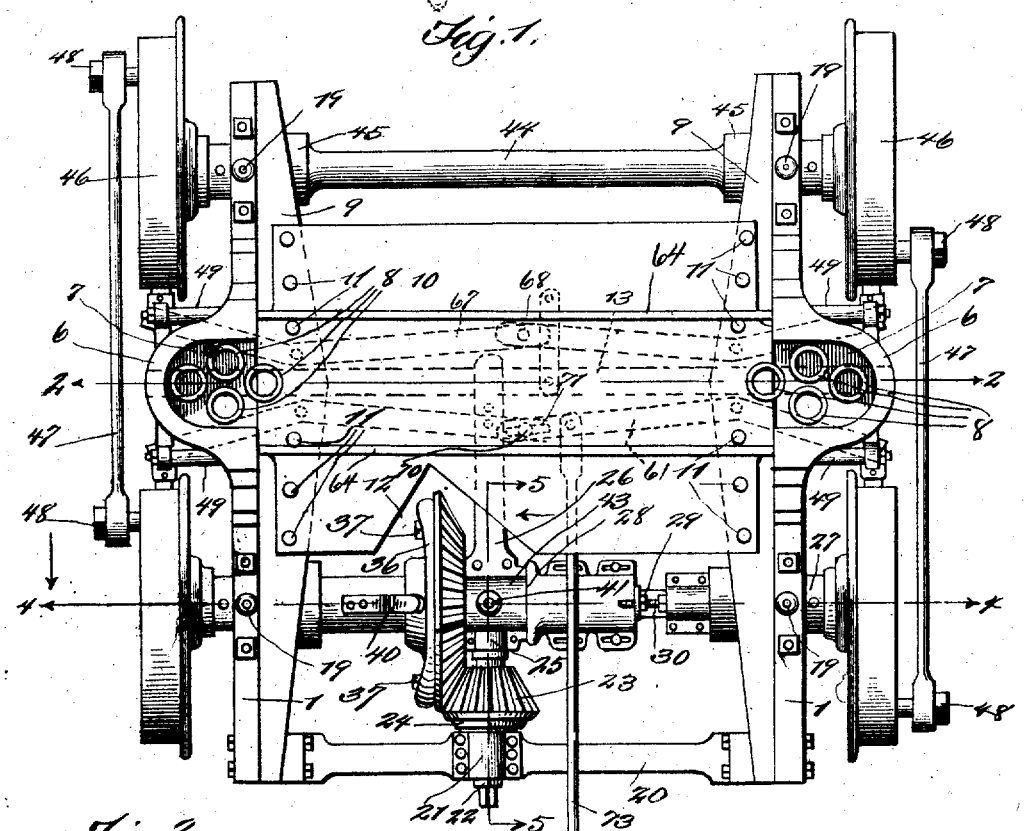
Figure 2:
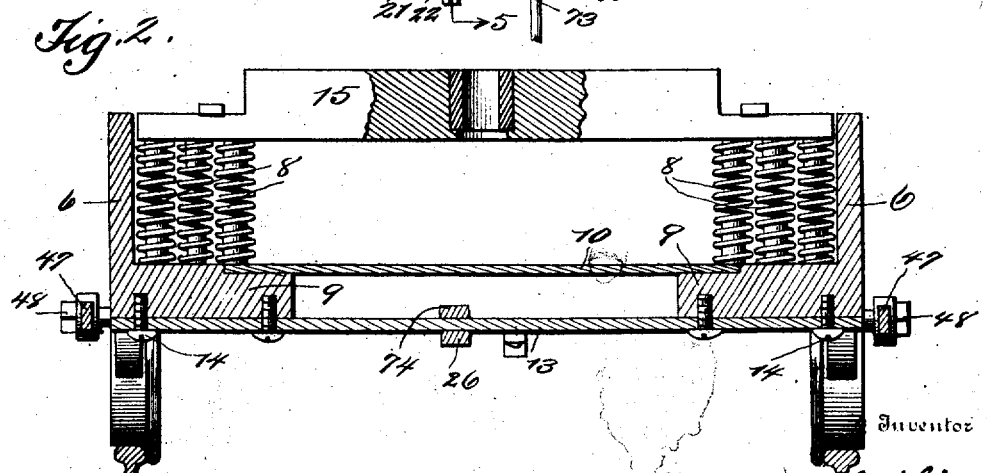

The invention is clearly illustrated in the accompanying drawings, which, with the numerals of reference marked thereon, form a part of this specification, and in which Figure 1 is a top plan view of my improved truck. Fig. 2 is a vertical cross section on the line 2—2 of Fig. 1. Fig. 3 is a side elevation with one of the wheels removed. Fig 4 is a cross section on the line 4—4 of Fig. 1. Fig. 5 is a vertical longitudinal section on the line 5—5 of Fig. 1, looking in the direction of the arrow. Fig. 6 is a perspective view of one of the brake shoe holders, showing the brake shoe and the closely associated parts. Fig. 7 is a perspective view of the guide box removed. Fig. 8 is an elevation of the side of the truck frame removed. Fig. 9 is an enlarged sectional detail of the main gear wheel. Fig. 10 is a view looking at the opposite side of the guide box, as seen in Fig. 7.

Like numerals of reference indicate like parts throughout the several views.

Referring now to the details of the drawings 1, 1 are the side frames of the truck each provided with two journal bearings 2, 2, as seen best in Fig. 8; 3, 3 being the complemental portions of the bearings, secured in position by the vertical bolts 4 passing through the flanges 5 thereon and through the side frames. Each of the side frames is provided with an outwardly bowed or curved portion 6 providing a chamber 7 in which are disposed the springs 8, as indicated best in Figs. 1 and 2. Each of these side frames has an inwardly extending projection at the bottom, and fitted to and secured to these inwardly extending projections is the steel plate 10 secured by bolts or other means 11 passed through projections in the flanges, and thus connected the truck cannot possibly get out of square, the two side frames being fixedly held in parallel relation. This plate is cut away, as shown at 12, to provide an opening through which the main gear wheel of the forward shaft may operate, as seen in Fig. 1.

13 is the bottom cross brace secured as by bolts or screws 14 to the under sides of the side frames, as seen best in Fig. 2.

15 is the truck bolster mounted upon the springs 8, as seen best in Fig. 2, being represented by dotted lines in Fig. 1.

16 is a metallic strap for holding down the main truck bolster, being secured by stud bolts 17 to the horizontal shoulders or portions 18 of the side frames, as seen in Figs. 3 and 8. It will be seen that the strap 16 is made readily removable so that the bolster may at any time be removed for the renewal of broken springs or for other purposes without interfering with the truck frames.

Each side frame is provided with an oil cup 19 at each end, as shown in Figs. 1 and 3, by means of which lubricant is supplied to the journals of the rear and front axles, as will be clearly understood from Figs. 1 and 3.

20 is the front cross brace secured to the forward ends of the side frames, as seen best in Fig. 1, and this cross brace is formed with a central bearing 21 for the central longitudinal shaft 22. This shaft is designed to receive its power from any suitable type of engine. On the rear end thereof is a beveled pinion 23, the forward or large end 24 of which has a solid face, the teeth not being cut all the way, which adds greatly to the strength of the gear wheel and to the life of the teeth or cogs and prevents them from breaking. This longitudinal shaft 22 extends entirely through the pinion about two and a half inches or more and has a bearing at its rear end in a box or bearing 25 in the forward end of the T-guide 26, as seen best in Fig. 10. This T-guide is kept in place by being clamped to the driving axle 27, as seen at 28 in Fig. 1. It is adjusted by means of the nut 29 on a stud bolt 30 engaged in the lug or the like 31 on the sleeve 32 on the axle, as seen best in Fig. 4. On this axle 27 are the driving wheels 33 of requisite diameter. On this axle 27 is the truck gear wheel 34 formed in two sections, the toothed portion 35 of which is bolted to the gear casing 36 by bolts 37, the heads of which are countersunk between the teeth or cogs of the toothed portion 35, as seen in Fig. 4. The portion 35 rests against a shoulder 39 on the sleeve on the axle, the gear wheel casing being made preferably of steel and keyed to the axle, as seen at 40 and resting against a shoulder on the back side which prevents it from being slipped. The longitudinal shaft 22 has a small shoulder against which the pinion 23 bears to prevent it from slipping. An oil cup 41 is provided for lubricating the shaft 27, as seen best in Figs. 4 and 5, which is mounted in the cap 42 which is secured to the T-guide box 26 and which with the concaved portion 43 thereof forms the bearing for the shaft 27.

44 is the rear truck axle having enlarged journals, as seen at 45 in Fig. 1 and on which are the rear driving wheels 46, seen also in said figure. 47 are side rods which drive the rear driving wheels 46, being connected with rest pins or the like 48 on said wheels, as will be clearly understood upon reference to Figs. 1 and 2. The journal brasses are provided with two oil boxes, one large one fitted in the frame in the socket and the other one at the outside end with oil hole extending through to the outside end which is very desirable and almost necessary on rough and crooked roads to oil between the journal brass and the driving wheel.

In practice it takes two of these trucks to make the motor gear for a locomotive, either one working in front or behind, the two being connected together by the longitudinal shaft, and when this is done four universal couplings are provided, one being very close to each truck which allows the shaft to give any way on pivotal bearings and still transmit the same power to the gear wheel. The gear wheels being on the forward axle or the axle nearest the engine permits the trucks to make a sharper curve, and brings the boxing and most of the parts which are liable to need attention and repairs to the place where they can be readily gotten at without removing anything, which is a great convenience and saving of time.

It is to be understood that the driving wheels and the gear wheels should be made of a diameter according to the grade and other conditions. Upon an ordinary forty ton locomotive the driving wheels should be say thirty-six inches in diameter, with four and a half ball and one-half inch taper to the ball, and the truck gear wheel 34 should be say twenty-eight inches in diameter and the coöperating gear 23 fourteen inches in diameter, these proportions, however, being changed according to the varying conditions and road for which the truck is to be constructed.

Projecting laterally from each side frame 1 adjacent the curved portions 6 thereof are the outwardly extending pins 49 which serve as pivots upon which the brake hangers 50 are pivotally mounted, as seen best in Figs. 3 and 8. These brake hangers 50 are received within the bifurcations 51 of the brake shoe holders 52, a pivot 53 being supported in the bifurcations and receiving the lower end of the hanger, as seen clearly in Fig. 6. The brake shoe hanger has lugs 54 at its upper and lower ends and an intermediate lug 55 through which passes the vertical bolt 56 which serves as a pivot for the brake shoe 57, all as clearly illustrated in Fig. 6.

58 is a brake beam engaged in the groove 59 in the brake shoe holder 52 to which is pivotally mounted the bifurcated end 60 of an adjustable lever 61, 62 being the pivot thereof.

Fig. 8 shows clearly the connection between two brake shoe holders, the lever being shown in two parts adjustably connected, as seen at 63 in said view.

64 in Fig. 8 indicates holes in the side frames for the connection of the cross brace rods which are secured by bolts with nuts on the outer ends thereof. On the inner face of each of the side frames at the bottom thereof is a lug or projection 65, seen best in Fig. 8 to which to bolt the bottom cross brace 13.

67 is a sectional brake beam for the back wheel, as seen in Fig. 1, the adjacent ends of the sections thereof being pivotally connected together by a pin 68 on the one number engaging in the overlapped end of the other member. The sectional brake beam 61, the end of which is seen in Fig. 6, is similar in its nature and is connected at the adjacent ends of its members by a pin 70 on the one member engaging a slot 71 in the overlapping end of the other member. This brake beam is supported by a metallic strap bolted to the bottom of the steel plate 10, said steel plate having a projection downward from its bottom and bolted to the supporting strap in front of the brake beam 67 to prevent it from coming forward, which otherwise would occur when the brake rod 73 is pulled upon.

73 is the brake rod pivotally connected with the brake beam 61, all as clearly seen in Fig. 1.

The rear end of the T-guide 26 is provided with a top fork 74 which is made removable, as indicated in Fig. 7, there being a space or bifurcation, as seen in said figures, for the reception of the bottom cross brace 13, as seen in Fig. 2.

It is to be noted that the cogs or teeth of the beveled gears point straight to the center of their shafts instead of being skew or twist gears. It will also be noted that the gear wheels are located on the inside or forward axle and clear of the bolster and that the brakes on each truck are entirely independent of each other.

From the above it will be seen that I have devised a simple, strong and durable truck for the purpose set forth, and while the structural embodiment of my invention as hereinbefore disclosed is what I at the present time consider preferable, it is evident that the same is subject to changes, variations and modifications in the relative arrangement and proportion of parts without departing from the spirit of the invention or sacrificing any of its advantages. I therefore do not wish to limit myself to the details of construction hereinbefore disclosed, but reserve the right to make such changes, variations and modifications as come properly within the scope of the appended claims.

What is claimed as new is:—

1. In a truck of the character described, a central longitudinal driving shaft, a gear thereon, a front cross brace having a bearing for said shaft, a driving axle, and a gear thereon meshing with the gear on the longitudinal shaft.

2. In a truck of the character described, side frames having inwardly extending projections, and a plate secured to said projections to keep the side truck frames parallel with each other and cut away at its forward edge to receive the main gear wheel.

3. In a truck of the character described, side truck frames having inwardly extending portions at their lower sides, a steel plate secured to said projections and having an opening for the gear on the front driving axle, combined with the front driving axle and the gear thereon.

4. In a truck of the character described, side truck frames having inwardly projecting portions at their lower sides, a metal plate secured to and resting on said projections and having an opening for the gear on the front driving axle, combined with the front driving axle, a gear thereon, a longitudinal shaft and a gear thereon meshing with said gear.

5. In a truck of the character described, side frames having inwardly projecting portions, a plate resting on and secured to the same, a front brace connecting the forward portions of said side frames, a central longitudinal driving shaft having a bearing in said cross brace, the forward driving axle, means for driving said axle from said shaft, and means for driving the rear axle therefrom.

6. In a truck, a side truck frame formed with a central outwardly curved portion, an inwardly extending portion at its lower side and openings for the reception of cross braces, and projecting portions forming pivots for the brake shoe holder hangers.

7. In a truck, a front driving axle, a front cross brace, a guide clamped about the front driving axle and having a bearing for a shaft, and a longitudinal central shaft having its rear end mounted in said bearing and its portion forward thereof mounted in said cross brace.

8. A locomotive engine truck having a pair of gear wheels, and a plate secured to the side truck frames and having an opening for one of said gears, said truck being designed to be coupled to another truck with the brakes on each truck independently mounted and operated.

9. In a truck of the character described, a side truck frame, a hanger pivotally mounted thereon, a brake shoe holder pivotally connected with the hanger and having lugs to receive the pivot of a brake shoe, and a groove upon the opposite face to receive a brake beam.

10. In a truck of the character described, side truck frames having outwardly projecting curved portions, studs upon opposite sides of the curved portions, and axle bearings near the ends, combined with axles mounted in said bearings, wheels on said axles, brake shoe holders pivotally supported from said studs, and means connecting said holders.

11. In a truck of the character described, side truck frames having outwardly projecting curved portions near their mid length, studs upon opposite sides of the curved portions, and axle bearings near the ends, combined with axles in said bearings, wheels on the axles, brake shoe holders suspended pivotally from said studs, and an adjustable rod connecting said brake shoe holders.

12. In a truck, a member having at one end a bearing for the end of a longitudinal driving shaft, a transversely disposed bearing for an axle, and a removable portion at the opposite end.

13. In a truck of the character described, the combination with a longitudinal shaft and a beveled pinion on the rear end thereof, of a bevel gear meshing with said pinion and comprising a beveled portion having teeth and a separable casing, and means connecting the same together, said means being countersunk between the said teeth and a plate secured to the side frames of the truck and having an opening for the said pinion.

Signed by me at Mount Sterling N. C. this 14th day of November 1907.

OSCAR C. HOPKINS.

Witnesses:
W. C. BARKER,
LLOYD HOPKINS.